Jan. 25, 1938. C. BRYAN 2,106,370
FISHHOOK
Filed March 16, 1936
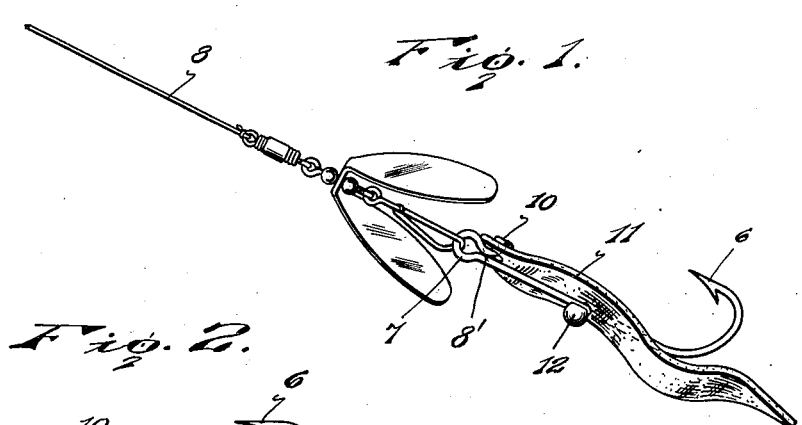
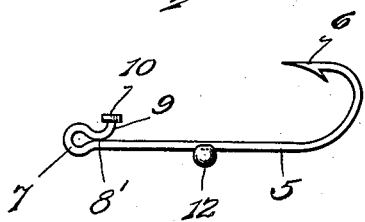
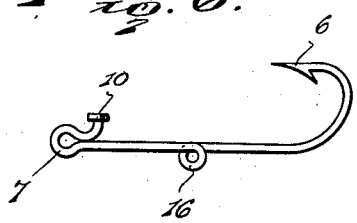
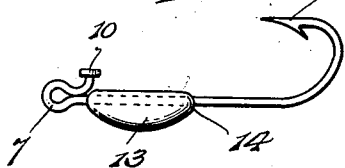
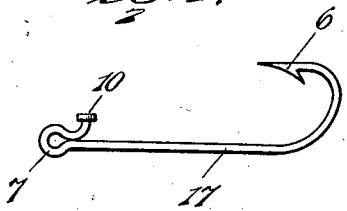
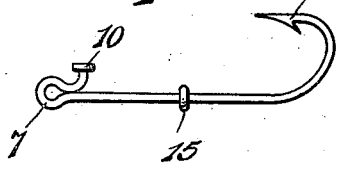
Inventor
Clare Bryan.
By Lacey & Lacey, Attorneys Patented Jan. 25, 1938

2,106,370

UNITED STATES PATENT OFFICE 2,106,370

FISHHOOK

Clare Bryan, Chicago, Ill.

Application March 16, 1936, Serial No. 69,238

1 Claim. (Cl. 43—40)

This invention relates to fish hooks and more particularly to a fish hook especially designed to receive and support a strip of pork rind or similar bait.

It is common practice at present to hold a strip of pork rind on a fish hook by passing the main barb of the hook through an opening in the pork rind and then sliding the rind forward on the shank of the hook for attachment to a relatively small auxiliary hook. This manner of attaching the bait to the hook is objectionable due to the fact that when casting toward the wind there is nothing to hold the pork rind taut on the hook with the result that the rind will slide on the hook shank toward the forward end of the hook and tend to form a loop which prevents the rind from wiggling and otherwise properly functioning when the bait is drawn through the water.

The object of the invention, therefore, is to overcome this objectionable feature by providing novel means for attaching and holding the pork rind taut on the fish hook so that when drawn through the water a wiggling motion will be imparted to the bait in simulation of a live minnow.

A further object of the invention is to provide a fish hook having a head extending laterally from one side of the shank and to which the forward end of the pork rind is anchored, there being a shoulder or stop on the shank spaced from and coacting with the head for keeping the pork rind taut and preventing sliding movement thereof relative to said shank.

A further object is to provide a hook, the intermediate portion of the shank of which is bent to form an eye constituting a stop or shoulder, the end of the shank being extended upwardly in a vertical plane to form a loop for attachment to a fishing line.

A still further object of the invention is generally to improve this class of devices so as to increase their utility, durability and efficiency.

In the accompanying drawing forming a part of this specification and in which similar numerals of reference indicate corresponding parts in all the figures of the drawing:

Figure 1 is a perspective view of a fish hook constructed in accordance with the present invention showing the manner of supporting a pork rind thereon.

Figure 2 is a side elevation.

Figure 3 is a top plan view of Figure 2.

Figure 4 is a side elevation illustrating a modified form of the invention.

Figure 5 is a similar view illustrating another modification.

Figures 6 and 7 are similar views illustrating further modifications.

The improved fish hook forming the subject-matter of the present invention comprises a shank 5 having one end thereof terminating in a barb 6 and its other end bent upwardly and forwardly to form a vertically disposed loop or eye 7 for attachment to a fishing line, indicated at 8. After the loop or eye 7 is formed, the metal is soldered or otherwise secured to the shank of the hook, as indicated at 8', and thence extended laterally on one side of said shank to form a stop pin 9 terminating in an enlarged head 10. The pin 9 forms an anchoring means for one end of a conventional pork rind, indicated at 11. Secured to the intermediate portion of the shank 5 on that side thereof opposite the head 10 is a stop 12 of any desired size and shape although it is preferred that the stop be constructed of metal to give it the desired weight and soldered or otherwise permanently secured to the shank, as best shown in Figure 2 of the drawing.

Pork rind strips used at present for fishing purposes generally have two holes punched therein, one near the forward end of the rind and the other spaced a short distance therefrom. In applying the rind to the hook, the barb of the hook is passed through one of the openings in the rind and said rind slipped longitudinally of the shank of the hook until it contacts with the shoulder 12 after which the other opening in the rind is fitted over the head 10 so as to hold the rind taut and prevent looping or buckling thereof when casting against the wind. It will thus be seen that the headed pin 9 serves to anchor the forward end of the pork rind to the shank of the hook while the stop 12 serves to prevent sliding movement of the rind relative to the shank and hold the forward end of the rind under tension so that as the hook is drawn through the water, the pork rind will simulate the wiggling movement of a live minnow. It will, furthermore, be noted that the headed pin 9, line attaching loop 7, and shank 5 of the hook are of integral formation thereby permitting the hooks to be readily constructed and at the same time reducing the cost of manufacture.

In Figure 4 of the drawing there is illustrated a modified form of the invention in which the shank of the hook is provided with a weight 13 which is soldered or otherwise permanently secured to said shank and is employed when a weighted hook is desired. The member 13, in addition to performing its function as a weight, also constitutes a stop as one portion of the pork rind will bear against the end 14 of the weight while the other end thereof will engage the headed pin.

Instead of having the stop 12 extending laterally from one side only of the shank, said stop may be in the form of a ring 15 which entirely surrounds the shank and is rigidly secured thereto, as best shown in Figure 5 of the drawing.

In Figure 6 of the drawing there is illustrated a different form of stop in which the metal constituting the body of the shank is bent or coiled upon itself, as indicated at 16, the construction and operation of the device being otherwise similar to that shown in Figures 1 and 2.

In some cases it may be desirable to dispense with the stop and in Figure 7 of the drawing I have illustrated a fish hook in which the shank 17 thereof is smooth and unobstructed throughout its entire length, the end of the shank, however, being formed with a line attaching loop and headed pin in the manner previously stated. It will here be noted that in each fish hook the metal constituting the shank of the hook is bent upwardly to form a vertical loop or eye for attachment to a fishing line and the metal at said loop extended laterally to form a stop pin terminating in an enlarged head which constitutes a means for anchoring one end of the pork rind. As previously stated, it is preferred to use a shoulder or stop in connection with the headed pin for holding the pork rind taut on the fish hook, but in certain cases the intermediate stop or shoulder on the shank of the hook may be dispensed with and I, therefore, do not desire to be limited in this respect.

It will, of course, be understood that the fish hooks may be made in different sizes and shapes and used in connection with any type of spinners, lures or other fishing paraphernalia without departing from the spirit of the invention.

Having thus described the invention, what is claimed as new is:

A fish hook consisting of a wire having one end portion curved to form a barbed hook and a shank extending in a straight line from the rear portion of the curved hook and terminating in an eye having a portion projecting from a side of the shank opposite the barb and a portion projecting from the same side of the shank as the barb, the latter portion of the eye having contacting relation with the shank and then extending laterally from the shank in the plane of the eye to form a pin having a head at its end, and an enlargement intermediate the length of the shank whereby a pork rind formed with a perforation intermediate the length thereof and a second perforation at one end thereof may be maintained in assembled relation on the fish hook with the shank of the hook and the pin extending through the perforations and the head of the pin disposed opposite one side face of the pork rind and the enlargement against the other side face of the pork rind, the portion of the rind between the pin and the enlargement lying substantially in contact with the adjacent portion of the shank throughout its length.

CLARE BRYAN.